(12) United States Patent
Binek et al.

(10) Patent No.: US 12,486,774 B2
(45) Date of Patent: Dec. 2, 2025

(54) COOLING NOZZLE VANES OF A TURBINE ENGINE

(71) Applicant: RTX Corporation, Farmington, CT (US)

(72) Inventors: Lawrence A. Binek, Glastonbury, CT (US); Paul M. Lutjen, Kennebunkport, ME (US); Jose R. Paulino, Jupiter, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/394,749

(22) Filed: Dec. 22, 2023

(65) Prior Publication Data

US 2025/0207500 A1 Jun. 26, 2025

(51) Int. Cl.
| | |
|---|---|
| *F01D 5/18* | (2006.01) |
| *F01D 9/06* | (2006.01) |
| *F02C 3/14* | (2006.01) |
| *F02C 7/12* | (2006.01) |
| *F23R 3/54* | (2006.01) |

(52) U.S. Cl.
CPC ............ *F01D 5/187* (2013.01); *F01D 9/065* (2013.01); *F02C 3/145* (2013.01); *F02C 7/12* (2013.01); *F23R 3/54* (2013.01); *F05D 2240/121* (2013.01); *F05D 2240/81* (2013.01)

(58) Field of Classification Search
CPC .... F02C 3/145; F02C 7/12; F23R 3/54; F01D 9/065; F01D 5/186; F01D 5/187; F05D 2260/20; F05D 2260/202; F05D 2240/81
See application file for complete search history.

(56) References Cited

U.S. PATENT DOCUMENTS

| | | | | |
|---|---|---|---|---|
| 5,711,650 | A | * 1/1998 | Tibbott | .................. F01D 5/189 415/115 |
| 6,269,628 | B1 | 8/2001 | Gates | |
| 7,621,718 | B1 | 11/2009 | Liang | |
| 8,226,360 | B2 | 7/2012 | Scoggins et al. | |
| 8,459,935 | B1 | * 6/2013 | Liang | ..................... F01D 5/187 416/193 A |
| 8,727,725 | B1 | * 5/2014 | Liang | ..................... F01D 5/143 415/115 |

(Continued)

OTHER PUBLICATIONS

EP Search Report for EP Patent Application No. 24223067.0 dated Jun. 11, 2025.

*Primary Examiner* — Christopher Verdier
(74) *Attorney, Agent, or Firm* — Getz Balich LLC

(57) ABSTRACT

An assembly is provided for a turbine engine. This assembly includes an engine structure, and the engine structure includes a plenum, a reverse flow combustor, a nozzle structure and a cooling circuit. The reverse flow combustor is disposed in the plenum and includes a combustion chamber. The nozzle structure is arranged at an outlet from the combustion chamber. The nozzle structure includes a first platform, a second platform and a plurality of vanes arranged circumferentially about an axis. The vanes extend across the flowpath from the first platform to the second platform. The cooling circuit extends in the first platform and between a circuit inlet into the cooling circuit and a circuit outlet from the cooling circuit. The circuit inlet is fluidly coupled with and disposed along the plenum. The circuit outlet is fluidly coupled with and disposed along the flowpath.

18 Claims, 11 Drawing Sheets

(56) References Cited

U.S. PATENT DOCUMENTS

| | | |
|---|---|---|
| 10,041,355 B2 | 8/2018 | Hussain |
| 10,612,392 B2 | 4/2020 | Slavens et al. |
| 10,830,056 B2 | 11/2020 | Erno |
| 2007/0095067 A1* | 5/2007 | Alkabie ................. F01D 9/023 60/725 |
| 2013/0315725 A1* | 11/2013 | Uechi ..................... F01D 9/023 415/208.1 |
| 2014/0366544 A1 | 12/2014 | Maccaul et al. |
| 2020/0362724 A1* | 11/2020 | Binek ....................... F23R 3/54 |
| 2022/0316408 A1* | 10/2022 | Binek ..................... F01D 25/12 |

* cited by examiner

COOLING NOZZLE VANES OF A TURBINE ENGINE

BACKGROUND OF THE DISCLOSURE

1. Technical Field

This disclosure relates generally to a turbine engine and, more particularly, to a stationary structure for the turbine engine.

2. Background Information

A gas turbine engine includes a stationary engine structure for housing and/or supporting internal rotating components of the gas turbine engine. Various stationary engine structures are known in the art. While these known stationary engine structures have various benefits, there is still room in the art for improvement.

SUMMARY OF THE DISCLOSURE

According to an aspect of the present disclosure, an assembly is provided for a turbine engine. This assembly includes an engine structure, and the engine structure includes a plenum, a reverse flow combustor, a nozzle structure and a cooling circuit. The reverse flow combustor is disposed in the plenum and includes a combustion chamber. The nozzle structure is arranged at an outlet from the combustion chamber. The nozzle structure includes a first platform, a second platform and a plurality of vanes arranged circumferentially about an axis. The first platform forms a first boundary of a flowpath through the nozzle structure. The second platform forms a second boundary of the flowpath. The vanes extend across the flowpath from the first platform to the second platform. The cooling circuit extends in the first platform and between a circuit inlet into the cooling circuit and a circuit outlet from the cooling circuit. The circuit inlet is fluidly coupled with and disposed along the plenum. The circuit outlet is fluidly coupled with and disposed along the flowpath.

According to another aspect of the present disclosure, another assembly is provided for a turbine engine. This assembly includes an engine structure, and the engine structure includes a plenum, a combustor, a nozzle structure and a cooling system. The combustor is disposed in the plenum and includes a combustion chamber. The nozzle structure includes a first platform, a second platform and a plurality of vanes arranged circumferentially about an axis. Each of the vanes extends across a flowpath through the nozzle structure from the first platform to the second platform. The vanes include a first vane. The cooling system includes a first passage and a second passage. The cooling system is configured to bleed air from the plenum to provide first cooling air and second cooling air. The cooling system is configured to direct the first cooling air through the first passage to a first outlet along the flowpath. The cooling system is configured to direct the second cooling air through the second passage to a second outlet along the flowpath. The first passage extends in the first platform to the first outlet. The second passage extends in the first vane to the second outlet.

According to still another aspect of the present disclosure, another assembly is provided for a turbine engine. This assembly includes an engine structure, and the engine structure includes a plenum, a combustor, a nozzle structure, a turbine wall, an intermediate structure and a cooling circuit. The combustor is disposed in the plenum and includes a combustion chamber. The nozzle structure includes a first platform, a second platform and a plurality of vanes arranged circumferentially about an axis. Each of the vanes extend across a flowpath through the nozzle structure from the first platform to the second platform. The turbine wall axially overlaps the combustor and the nozzle structure. The intermediate structure extends along the flowpath between a downstream end of the first platform and an upstream end of the turbine wall. The cooling circuit is disposed in the first platform and extends between a circuit inlet into the cooling circuit and a circuit outlet from the cooling circuit. The circuit inlet is fluidly coupled with and disposed along a portion of the plenum bordered by the first platform and the intermediate structure. The circuit outlet is fluidly coupled with and disposed along the flowpath.

The first passage and the second passage may be fluidly coupled to a common inlet along the plenum.

The first passage may extend between a first inlet along the plenum and the first outlet. The second passage may extend between a second inlet along the plenum and the second outlet.

The first passage and the second passage may be interconnected internally within the vane structure.

The first passage and the second passage may be fluidly discrete internally within the vane structure.

The vanes may include a first vane. The circuit outlet may be formed in a fillet between the first platform and the first vane.

The vanes may include a first vane. The circuit outlet may be formed in a surface of the first platform along the first vane.

The vanes may include a first vane. The circuit outlet may be disposed along and next to a suction side of the first vane.

The vanes may include a first vane. The circuit outlet may be a first circuit outlet. The cooling circuit may also extend between the circuit inlet and a second circuit outlet from the cooling circuit. The first circuit outlet and the second circuit outlet may be arranged longitudinally along a side of the first vane.

The side of the first vane may be a convex side of the first vane. Alternatively, the side of the first vane may be a concave side of the first vane.

The vanes may include a first vane. The cooling circuit may also extend in the first vane.

The circuit outlet may be formed in the first vane.

The first vane may extend longitudinally within the flowpath between a leading edge of the first vane and a trailing edge of the first vane. The circuit outlet may be arranged at the trailing edge of the first vane.

The circuit outlet may be a first circuit outlet. The cooling circuit may also extend between the circuit inlet and a second circuit outlet from the cooling circuit. The first circuit outlet and the second circuit outlet may be arranged along the trailing edge of the first vane.

The circuit outlet may be formed in a side surface of the first vane.

The side surface of the first vane may be a suction side surface of the first vane.

The circuit outlet may be a first circuit outlet. The cooling circuit may also extend between the circuit inlet and a second circuit outlet from the cooling circuit. The first circuit outlet and the second circuit outlet may be arranged along the side surface of the first vane.

The first platform may be an inner platform. The second platform may be an outer platform that circumscribes the inner platform.

The second platform may be an inner platform. The first platform may be an outer platform that circumscribes the inner platform.

The engine structure may also include a turbine wall and intermediate structure. The turbine wall may axially overlap the reverse flow combustor and the nozzle structure. The intermediate structure may extend along the flowpath between a downstream end of the first platform and an upstream end of the turbine wall. The circuit inlet may be disposed along a portion of the plenum bordered by the first platform and the intermediate structure.

The reverse flow combustor may also include a combustor wall connected to the first platform at an intersection. The engine structure may also include a divider wall radially between the first platform and the turbine wall. The divider wall may project axially from the intersection towards the intermediate structure. The portion of the plenum may extend radially between the first platform and the divider wall. The portion of the plenum may extend axially between the intermediate structure and the intersection.

The vanes may include a first vane and a second vane. The cooling circuit may be a first cooling circuit configured to air cool the first vane. The engine structure may also include a second cooling circuit configured to air cool the second vane. The second cooling circuit may extend in the first platform and between a second circuit inlet into the second cooling circuit and a second circuit outlet from the second cooling circuit. The second circuit inlet may be fluidly coupled with and disposed along the plenum. The second circuit outlet may be fluidly coupled with and disposed along the flowpath.

The first vane may circumferentially neighbor the second vane.

The vanes may also include a third vane configured without air cooling.

The first cooling circuit may have a different configuration than the second cooling circuit.

The engine structure may be configured as or otherwise included in a monolithic body.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
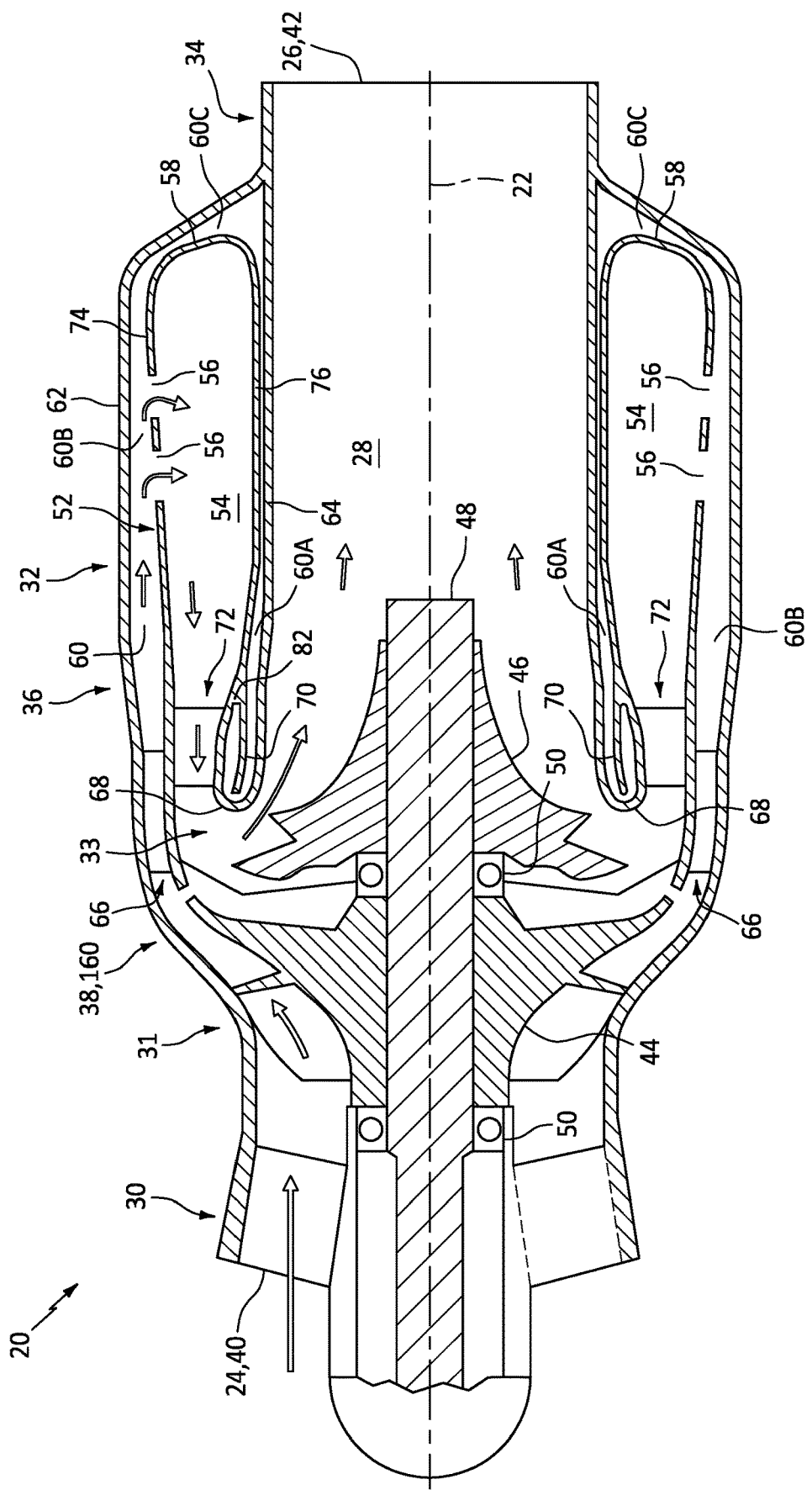
FIG. 1 is a schematic side sectional illustration of a turbine engine.

FIG. 1 is a side sectional illustration of a turbine engine 20. The turbine engine 20 of FIG. 1 is configured as a single spool, radial-flow turbojet gas turbine engine. This turbine engine 20 is configured for propelling an aircraft such as, but not limited to, an airplane, a drone (e.g., an unmanned aerial vehicle (UAV)), a spacecraft or any other manned or unmanned aerial vehicle or system. The present disclosure, however, is not limited to such an exemplary turbojet turbine engine configuration nor to an aircraft propulsion system application. For example, the turbine engine 20 may alternatively be configured as an auxiliary power unit (APU) for the aircraft, or an industrial gas turbine engine.

The turbine engine 20 of FIG. 1 extends axially along an axis 22 from a forward, upstream airflow inlet 24 into the turbine engine 20 to an aft, downstream combustion products exhaust 26 from the turbine engine 20. The axis 22 may be a centerline axis of the turbine engine 20 and/or a centerline axis of various components within the turbine engine 20. The axis 22 may also or alternatively be a rotational axis for various components within the turbine engine 20.

The turbine engine 20 includes a core flowpath 28, an inlet section 30, a compressor section 31, a (e.g., reverse flow) combustor section 32, a turbine section 33 and an exhaust section 34. At least (or only) the compressor section 31, the combustor section 32 and the turbine section 33 may form a core 36 of the turbine engine 20. The turbine engine 20 also includes a stationary engine structure 38. Briefly, this engine structure 38 may house and/or form the engine sections 31-33. The engine structure 38 may also form the engine sections 30 and 34.

The core flowpath 28 extends within the turbine engine 20 and its engine core 36 from an airflow inlet 40 into the core flowpath 28 to a combustion products exhaust 42 from the core flowpath 28. More particularly, the core flowpath 28 of FIG. 1 extends sequentially through the inlet section 30, the compressor section 31, the combustor section 32, the turbine section 33 and the exhaust section 34 between the core inlet 40 and the core exhaust 42. The core inlet 40 of FIG. 1 forms the engine inlet 24 into the turbine engine 20. The core exhaust 42 of FIG. 1 forms the engine exhaust 26 from the turbine engine 20. However, the core inlet 40 may alternatively be discrete and downstream from the engine inlet and/or the core exhaust 42 may alternatively be discrete and upstream from the engine exhaust.

The compressor section 31 includes a bladed compressor rotor 44. The turbine section 33 includes a bladed turbine rotor 46. Each of these engine rotors 44, 46 includes a rotor base (e.g., a hub or a disk) and a plurality of rotor blades (e.g., vanes or airfoils) arranged circumferentially around and connected to the rotor base. The rotor blades, for example, may be formed integral with or mechanically fastened, welded, brazed and/or otherwise attached to the respective rotor base.

The compressor rotor 44 may be configured as a radial flow compressor rotor (e.g., an axial inflow-radial outflow compressor rotor), and the compressor section 31 may be configured as a radial flow compressor section. The turbine rotor 46 may be configured as a radial flow turbine rotor (e.g., a radial inflow-axial outflow turbine rotor), and the turbine section 33 may be configured as a radial flow turbine section. The compressor rotor 44 is connected to the turbine rotor 46 through an engine shaft 48. This engine shaft 48 is rotatably supported by the engine structure 38 through a plurality of bearings 50; e.g., rolling element bearings, journal bearings, etc.

The combustor section 32 includes an annular combustor 52 with an annular combustion chamber 54. The combustor 52 of FIG. 1 is configured as a reverse flow combustor. Inlet ports 56 and/or flow tubes into the combustion chamber 54, for example, may be arranged at (e.g., on, adjacent or proximate) and/or towards an aft bulkhead wall 58 of the combustor 52. An outlet from the combustor 52 may be arranged axially aft of an inlet to the turbine section 33. The combustor 52 may also be arranged radially outboard of and/or axially overlap (e.g., extend along) at least a (e.g., aft) portion of the turbine section 33. With this arrangement, the core flowpath 28 of FIG. 1 reverses direction (e.g., from a forward-to-aft direction to an aft-to-forward direction) a first time as the core flowpath 28 extends from an annular diffuser plenum 60 surrounding the combustor 52 into the combustion chamber 54. The core flowpath 28 of FIG. 1 then reverses direction (e.g., from the aft-to-forward direction to the forward-to-aft direction) a second time as the core flowpath 28 extends from the combustion chamber 54 into the turbine section 33.

During turbine engine operation, air enters the turbine engine 20 through the inlet section 30 and its core inlet 40. The inlet section 30 directs the air from the core inlet 40 into the core flowpath 28 and the compressor section 31. The air entering the core flowpath 28 may be referred to as "core air". This core air is compressed by the compressor rotor 44. The compressed core air is directed through a diffuser and its diffuser plenum 60 into the combustion chamber 54. Fuel is injected and mixed with the compressed core air to provide a fuel-air mixture. This fuel-air mixture is ignited within the combustion chamber 54, and combustion products thereof flow through the turbine section 33 and drive rotation of the turbine rotor 46 about the axis 22. The rotation of the turbine rotor 46 drives rotation of the compressor rotor 44 about the axis 22 and, thus, compression of the air received from the core inlet 40. The exhaust section 34 directs the combustion products out of the turbine engine 20 into an environment external to the aircraft to provide forward engine thrust.

Figure 2:
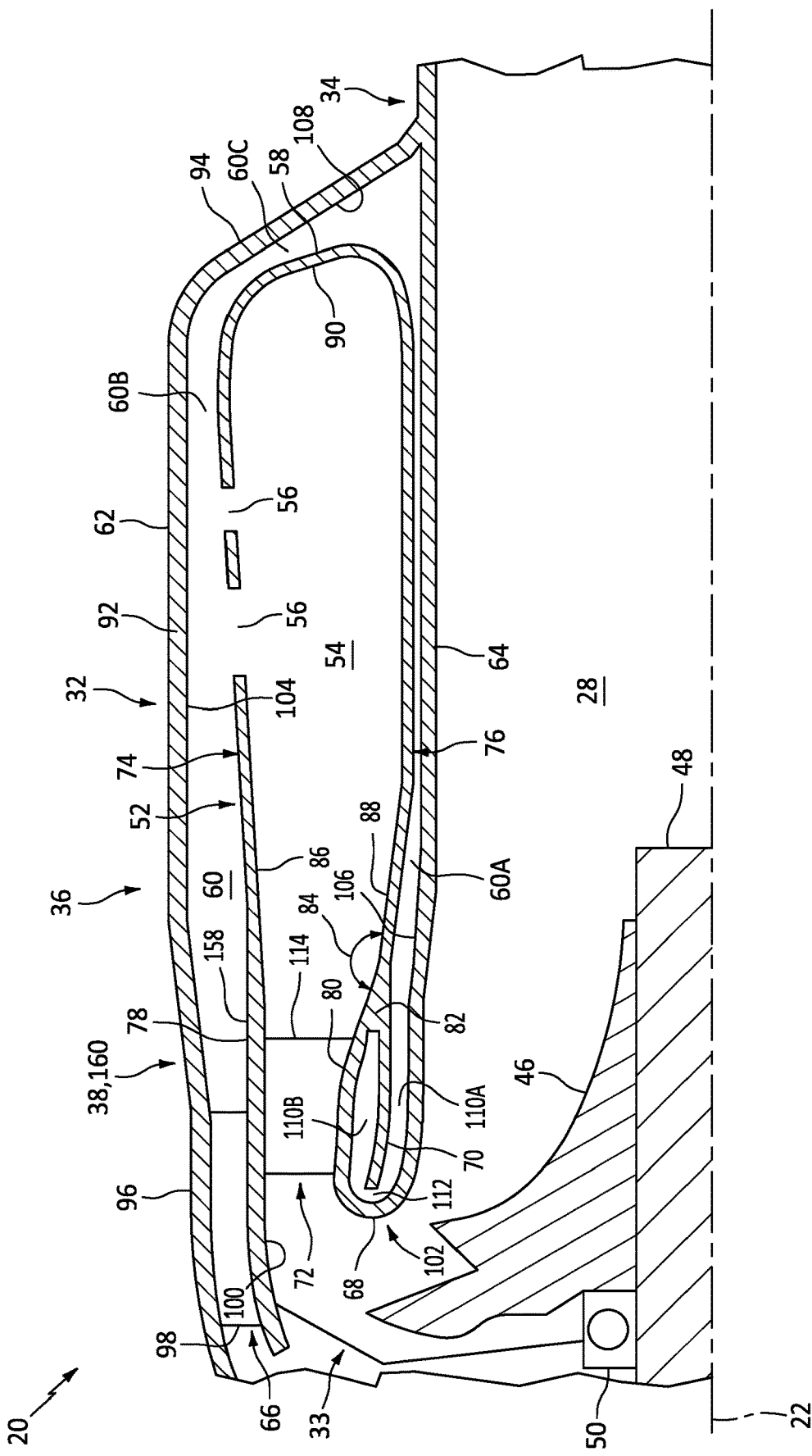
FIG. 2 is a schematic side sectional illustration of a portion of the turbine engine of FIG. 1 at its combustor.

Referring to FIG. 2, the engine structure 38 includes the combustor 52 and one or more engine walls 62 and 64 (e.g., cases) forming the diffuser plenum 60 along the combustor 52. The engine walls include a diffuser wall 62 and a turbine wall 64. The engine structure 38 of FIG. 2 also includes a diffuser nozzle 66, an annular intermediate structure 68, a tubular divider wall 70 and a turbine nozzle 72.

The combustor 52 of FIG. 2 includes a radial outer combustor wall 74, a radial inner combustor wall 76 and the bulkhead wall 58. The combustor 52 and each of its combustor walls 58, 74 and 76 extends circumferentially about (e.g., completely around) the axis 22. The combustor 52 and each of its combustor walls 74, 76 may thereby have a full-hoop (e.g., tubular) geometry, and the bulkhead wall 58 may have a full-hoop (e.g., annular, frustoconical, etc.) geometry.

The outer combustor wall 74 is arranged axially between the bulkhead wall 58 and the turbine nozzle 72. The outer combustor wall 74 of FIG. 2, for example, projects axially along the axis 22 (e.g., in the forward direction) out from the bulkhead wall 58 to a radial outer platform 78 of the turbine nozzle 72. The outer combustor wall 74 of FIG. 2 is connected to (e.g., formed integral with) the bulkhead wall 58 at a radial outer end of the bulkhead wall 58. The outer combustor wall 74 of FIG. 2 is also connected to (e.g., formed integral with) the turbine nozzle outer platform 78 at an upstream, aft end of the turbine nozzle outer platform 78. Here, the turbine nozzle outer platform 78 may be configured as a longitudinal extension of the outer combustor wall 74.

The inner combustor wall 76 is arranged axially between the bulkhead wall 58 and the turbine nozzle 72. The inner combustor wall 76 of FIG. 2, for example, projects axially along the axis 22 (e.g., in the forward direction) out from the bulkhead wall 58 to a radial inner platform 80 of the turbine nozzle 72. The inner combustor wall 76 of FIG. 2 is connected to (e.g., formed integral with) the bulkhead wall 58 at a radial inner end of the bulkhead wall 58. The inner combustor wall 76 of FIG. 2 is also connected to (e.g., formed integral with) the turbine nozzle inner platform 80 at an upstream, aft end of the turbine nozzle inner platform 80. At an intersection 82 between the inner combustor wall 76 and the turbine nozzle inner platform 80, the inner combustor wall 76 may be angularly offset from the turbine nozzle inner platform 80 by an included angle 84. This angle 84 may be an obtuse angle between, for example, one-hundred and twenty degrees) (120° and one-hundred and seventy degrees) (170°. The present disclosure, however, is not limited to such an exemplary arrangement.

The bulkhead wall 58 is arranged radially between the outer combustor wall 74 and the inner combustor wall 76. The bulkhead wall 58 of FIG. 2, for example, projects radially (e.g., outward away from the axis 22) out from the inner combustor wall 76 to the outer combustor wall 74. The bulkhead wall 58 of FIG. 2 is connected to the outer combustor wall 74 at an aft end of the outer combustor wall 74. The bulkhead wall 58 of FIG. 2 is connected to the inner combustor wall 76 at an aft end of the inner combustor wall 76.

The combustor walls 58, 74 and 76 collectively form the combustion chamber 54 of FIG. 2 within the combustor 52. An interior surface 86 (e.g., a tubular radial inner surface) of the outer combustor wall 74 borders (e.g., lines) the combustion chamber 54 and, more particularly, forms a radial outer peripheral boundary of the combustion chamber 54. An interior surface 88 (e.g., a tubular radial outer surface) of the inner combustor wall 76 borders the combustion chamber 54 and, more particularly, forms a radial inner peripheral boundary of the combustion chamber 54. An interior surface 90 (e.g., an annular forward surface) of the bulkhead wall 58 borders the combustion chamber 54 and, more particularly, forms a side peripheral boundary of the combustion chamber 54. The combustion chamber 54 thereby extends radially within the combustor 52 between the inner combustor wall 76 and its interior surface 88 and the outer combustor wall 74 and its interior surface 86. The combustion chamber 54 projects axially into the combustor 52 from the outlet of the combustion chamber 54 (e.g., at the turbine nozzle 72) to the bulkhead wall 58 and its interior surface 90.

The diffuser wall 62 is spaced radially outboard from the combustor 52 and the turbine nozzle 72. The diffuser wall 62 extends axially along the axis 22, and axially overlaps the combustor 52 and its outer combustor wall 74. The diffuser wall 62 may also axially overlap the turbine nozzle 72 and its turbine nozzle outer platform 78. The diffuser wall 62 of FIG. 2, for example, includes a diffuser sidewall 92 and a diffuser endwall 94. The diffuser sidewall 92 projects axially (e.g., in the forward direction) out from the diffuser endwall 94, axially along the outer combustor wall 74 and the turbine nozzle outer platform 78, to the diffuser nozzle 66. This diffuser sidewall 92 of FIG. 2 is connected to (e.g., formed integral with) the diffuser endwall 94 at a radial outer end of the diffuser endwall 94. The diffuser sidewall 92 of FIG. 2 is also connected to (e.g., formed integral with) a radial outer platform 96 of the diffuser nozzle 66 at a downstream, aft end of the turbine nozzle outer platform 78. The diffuser endwall 94 projects radially (e.g., outward away from the axis 22) out from the turbine wall 64, along the bulkhead wall 58, to the diffuser sidewall 92. This diffuser endwall 94 of FIG. 2 is connected to (e.g., formed integral with) the diffuser sidewall 92 at a downstream, aft end of the diffuser sidewall 92, and to the turbine wall 64. The diffuser wall 62 and its members 92 and 94 extend circumferentially about (e.g., completely around) the axis 22. The diffuser wall 62 and its members 92 and 94 may thereby circumscribe the combustor 52 and/or the turbine wall 64.

The diffuser nozzle 66 is a vane array structure. This diffuser nozzle 66 is configured to condition the core air leaving the compressor section 31 (see FIG. 1) and entering the diffuser plenum 60. The diffuser nozzle 66 of FIG. 2, for example, includes one or more diffuser vanes 98 (e.g., guide vanes) configured to impart swirl to the core air. These diffuser vanes 98 are arranged (e.g., equispaced) circumferentially about the axis 22 in an annular diffuser vane array. Each of the diffuser vanes 98 extends radially across the core flowpath 28. Each of the diffuser vanes 98 of FIG. 2, for example, extends radially between and is connected to (e.g., formed integral with) the diffuser nozzle outer platform 96 and a radial inner platform 100 of the diffuser nozzle 66. Here, the diffuser nozzle inner platform 100 may be partially (or completely) formed by the turbine nozzle 72 and its turbine nozzle outer platform 78. However, in other embodiments, the diffuser nozzle inner platform 100 and the turbine nozzle outer platform 78 may be discrete from one another; e.g., axially offset from one another.

The turbine wall 64 is spaced radially outboard of the turbine rotor 46. The turbine wall 64 extends axially along the axis 22, and axially overlaps at least a downstream, aft portion of the turbine rotor 46. The turbine wall 64 extends circumferentially about (e.g., completely around) the axis 22, and circumscribes at least the aft portion of the turbine rotor 46. The turbine wall 64 thereby houses at least the aft portion of the turbine rotor 46. The turbine wall 64 also forms a radial outer peripheral boundary of the core flowpath 28 across at least the aft portion of the turbine rotor 46.

The turbine wall 64 of FIG. 2 is spaced radially inboard from the combustor 52 and the turbine nozzle 72. The turbine wall 64 may be connected to the turbine nozzle inner platform 80 by the intermediate structure 68. This intermediate structure 68 may have a curved and/or folded-over geometry (e.g., a substantially U-shaped geometry, a semicircular geometry, etc.) which extends from an upstream, forward end of the turbine wall 64 to a downstream, forward end of the turbine nozzle inner platform 80. With this arrangement, at least (or only) the turbine wall 64, the turbine nozzle inner platform 80 and the intermediate structure 68 may collectively form a flowpath wall structure 102 which forms a peripheral boundary of the core flowpath 28 in the turbine section 33. This flowpath wall structure 102 also wraps around a downstream end region of a radial inner section 60A of the diffuser plenum 60.

The engine walls 62 and 64 collectively form the diffuser plenum 60 of FIG. 2 around the combustor 52. A (e.g., tubular) radial inner surface 104 of the diffuser sidewall 92 forms a radial outer peripheral boundary of the diffuser plenum 60 radially outboard of the combustor 52 and its outer combustor wall 74. A (e.g., tubular) radial outer surface 106 of the turbine wall 64 forms a radial inner peripheral boundary of the diffuser plenum 60 radially inboard of the combustor 52 and its inner combustor wall 76. An (e.g., annular) axial side surface 108 of the diffuser endwall 94 forms a side peripheral boundary of the diffuser plenum 60 axially to a side of the combustor 52 and its bulkhead wall 58. With this arrangement, a radial outer section 60B of the diffuser plenum 60 extends radially between, is formed by and thereby is bordered by (A) the diffuser wall 62 and (B) the outer combustor wall 74 and the turbine nozzle outer platform 78. The radial inner section 60A of the diffuser plenum 60 extends radially between, is formed by and thereby is bordered by (A) the turbine wall 64 and (B) the inner combustor wall 76 and the turbine nozzle inner platform 80. An axial end section 60C of the diffuser plenum 60 extends axially between, is formed by and thereby is bordered by the diffuser endwall 94 and the bulkhead wall 58. The diffuser plenum 60 may thereby extend axially along each combustor wall 74, 76 and radially along the bulkhead wall 58. With this arrangement, the diffuser plenum 60 may wrap around the combustor 52 from or about the diffuser nozzle 66 to the flowpath wall structure 102 and its intermediate structure 68.

The divider wall 70 may be connected to (e.g., formed integral with) the inner combustor wall 76 and/or the turbine nozzle inner platform 80 at the intersection 82. The divider wall 70 of FIG. 2, for example, projects axially out from the intersection 82 into the diffuser plenum 60, in an axial direction towards the flowpath wall structure 102. More particularly, the divider wall 70 of FIG. 2 projects axially into the downstream end region of the radial inner section 60A of the diffuser plenum 60 partially towards (or to) the intermediate structure 68. Here, the divider wall 70 may be configured as a longitudinal extension of the inner combustor wall 76. The divider wall 70 axially overlaps, is spaced radially outboard from and extends circumferentially about (e.g., circumscribes) an axial forward section of the turbine wall 64 next to the intermediate structure 68. The divider wall 70 axially overlaps and is spaced radially inboard from an axial forward section of the turbine nozzle inner platform 80, at least axially forward of the intersection 82. Here, the turbine nozzle inner platform 80 of FIG. 2 extends circumferentially about (e.g., circumscribes) the divider wall 70.

The divider wall 70 of FIG. 2 fluidly divides the downstream end region of the diffuser plenum 60 into a (e.g., annular) radial inner portion 110A and an a (e.g., annular) radial outer portion 110B. The plenum inner portion 110A is disposed radially between and is bordered by the turbine wall 64 and the divider wall 70. This plenum inner portion 110A extends axially along the turbine wall 64 and/or the divider wall 70 to the intermediate structure 68. The plenum outer portion 110B is disposed radially between and is bordered by the divider wall 70 and the turbine nozzle inner platform 80. This plenum outer portion 110B extends axially along the divider wall 70 and/or the turbine nozzle inner platform 80 between the intersection 82 and the intermediate structure 68. The plenum outer portion 110B of FIG. 2 is fluidly coupled with the plenum inner portion 110A by a gap 112 (or multiple gaps) axially between the divider wall 70 and the intermediate structure 68. With this arrangement, the downstream end region of the diffuser plenum 60 of FIG. 2 extends axially in the forward direction towards the intermediate structure 68, wraps around the divider wall 70 through the gap 112 (or gaps), and extends axially in the aft direction to the intersection 82.

The turbine nozzle 72 is a vane array structure. This turbine nozzle 72 is configured to condition the combustion products exiting the combustor 52 and its combustion chamber 54. The turbine nozzle 72 of FIG. 2, for example, includes one or more turbine vanes 114 (e.g., guide vanes) configured to impart swirl to the combustion products. These turbine vanes 114 are arranged (e.g., equispaced) circumferentially about the axis 22 in a turbine vane array. Each of the turbine vanes 114 extends radially across the core flowpath 28. Each of the turbine vanes 114 of FIG. 2, for example, extends radially between and is connected to (e.g., formed integral with) the turbine nozzle outer platform 78 and the turbine nozzle inner platform 80. Here, a radial outer surface of the turbine nozzle inner platform 80 forms a radial inner peripheral boundary of the core flowpath 28 (e.g., axially) through the turbine nozzle 72. A radial inner surface of the turbine nozzle outer platform 78 forms a radial outer peripheral boundary of the core flowpath 28 through the turbine nozzle 72, which radial outer peripheral boundary is radially opposite the inner peripheral boundary formed by the turbine nozzle inner platform 80.

Figure 3:
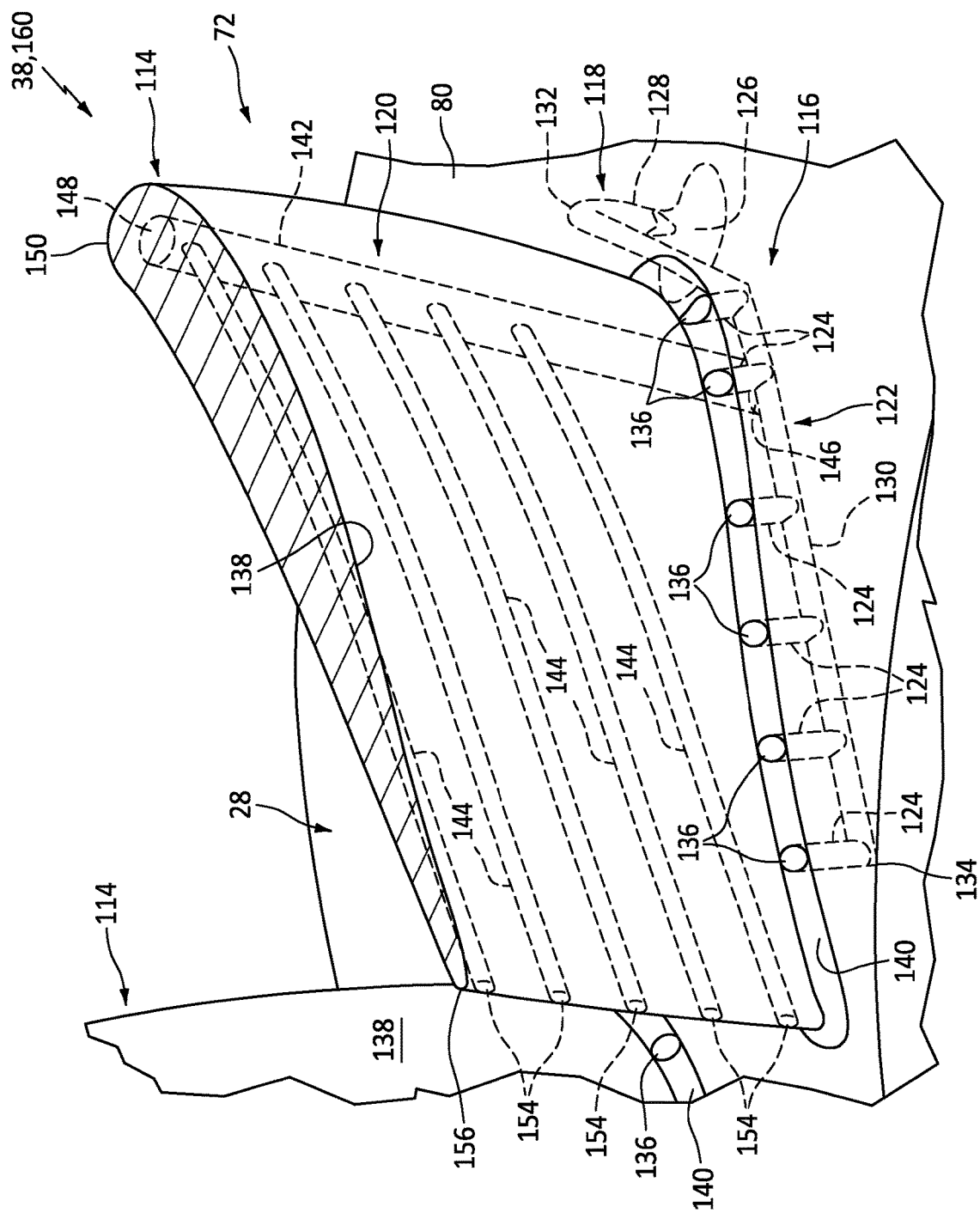
FIG. 3 is a perspective cutaway illustration of a portion of the turbine engine of FIG. 1 with a turbine nozzle and a cooling system.

During operation of the turbine engine 20, heat energy transfers from the combustion products into the turbine vanes 114 as the combustion products flow through the turbine nozzle 72. Referring to FIG. 3, to reduce or prevent thermal erosion and/or degradation of the turbine vanes 114, the engine structure 38 includes a cooling system 116 for air cooling the turbine nozzle 72 and one or more of its members; e.g., the turbine vanes 114 and/or the turbine nozzle inner platform 80. This cooling system 116 includes a respective platform cooling circuit 118 and/or a respective vane cooling circuit 120 associated with each turbine vane 114.

Figure 4:
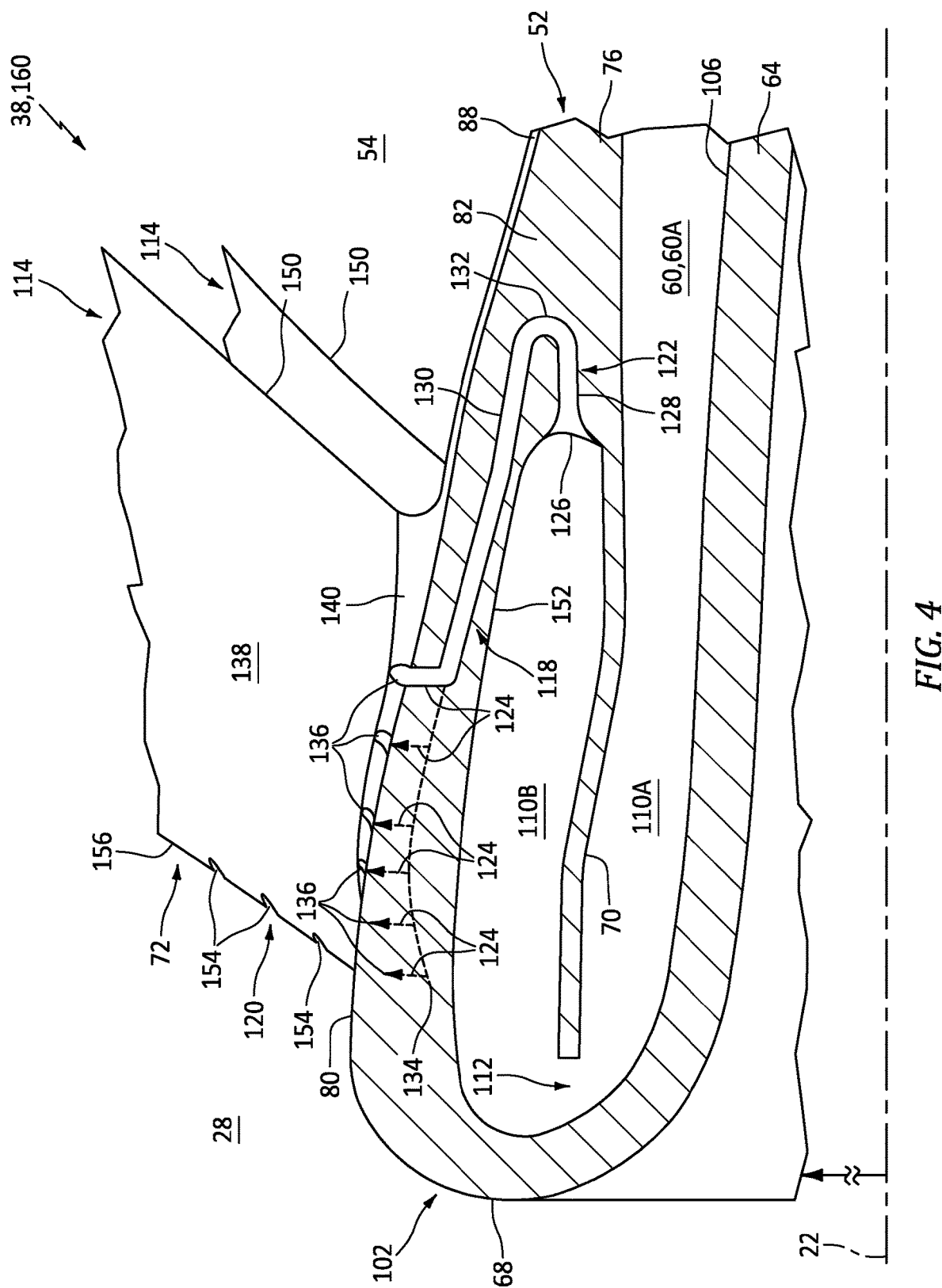
FIG. 4 is a perspective cutaway illustration of another portion of the turbine engine of FIG. 1 with the turbine nozzle and a platform cooling circuit.

Referring to FIG. 4, each platform cooling circuit 118 is disposed substantially (or completely) within the turbine nozzle inner platform 80. Each platform cooling circuit 118 includes a platform circuit feed passage 122 and one or more platform circuit outlet passages 124. The platform circuit feed passage 122 fluidly couples (e.g., in parallel) a platform circuit inlet 126 into the respective platform cooling circuit 118 to the platform circuit outlet passages 124. The platform circuit feed passage 122 of FIG. 4, for example, includes an inner leg 128, an outer leg 130 and a curved intermediate leg 132. The inner leg 128 extends from the platform circuit inlet 126, in the axial aft direction, to an upstream, inner end of the intermediate leg 132. The outer leg 130 extends from a downstream, outer end of the intermediate leg 132, in the axial forward direction, to a distal end 134 of the platform circuit feed passage 122. The intermediate leg 132 extends between and fluidly couples the inner leg 128 to the outer leg 130. The platform circuit inlet 126 is disposed along the plenum outer portion 110B. The platform circuit inlet 126 of FIG. 4, for example, is disposed at the intersection 82 along a downstream end of the diffuser plenum 60. The platform circuit inlet 126 thereby fluidly couples the diffuser plenum 60 to the platform circuit feed passage 122 and its inner leg 128.

Figure 5:
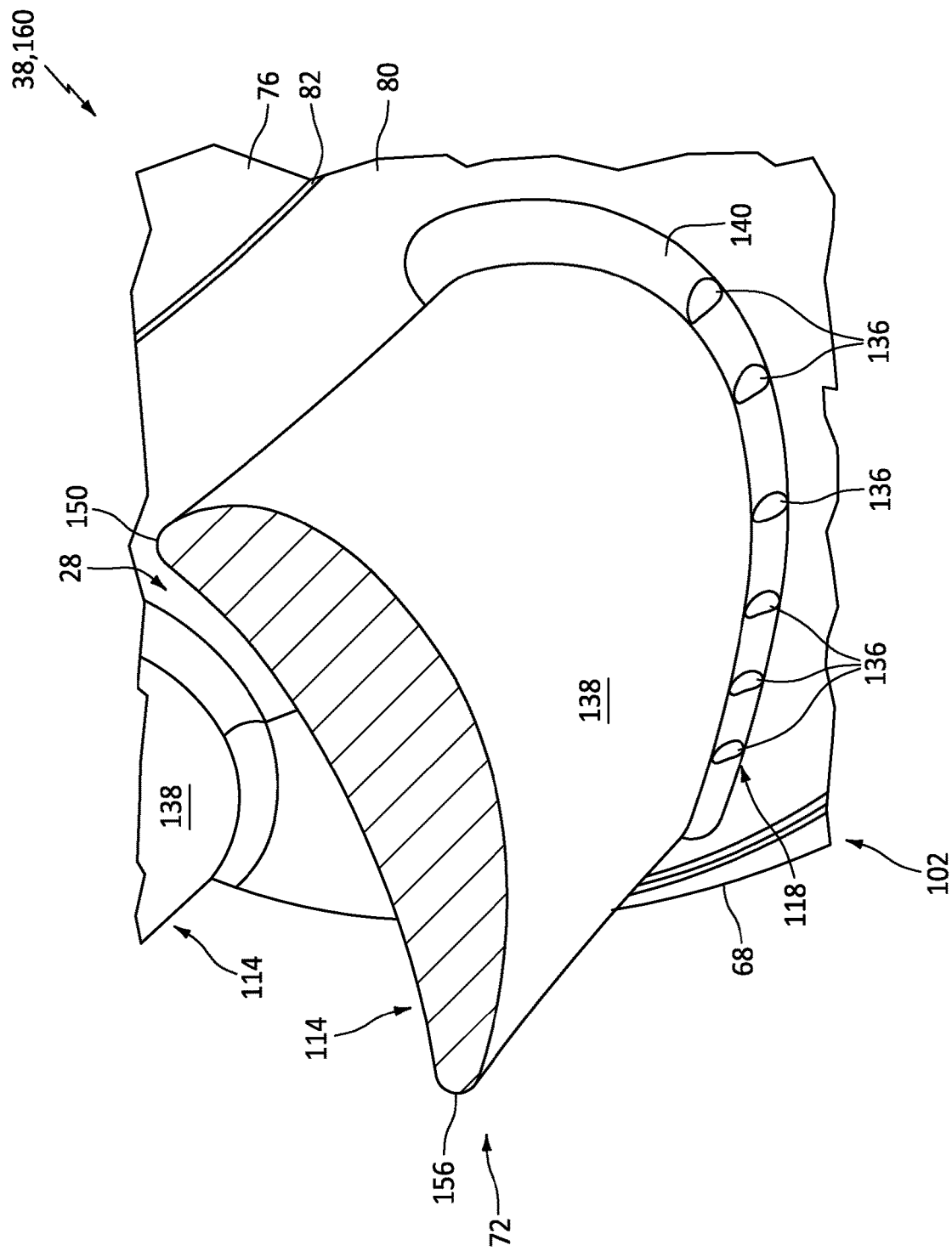
FIG. 5 is a perspective cutaway illustration of another portion of the turbine engine of FIG. 1 with the turbine nozzle and the platform cooling circuit.

The platform circuit outlet passages 124 fluidly couple the platform circuit feed passage 122 to respective platform circuit outlets 136 from the platform cooling circuit 118. The platform circuit outlet passages 124 of FIG. 4, for example, are arranged longitudinally along the platform circuit feed passage 122 and its outer leg 130. Each platform circuit outlet passage 124 extends, in a radial outward direction, from the platform circuit feed passage 122 and its outer leg 130 to a respective one of the platform circuit outlets 136. Referring to FIG. 5, the platform circuit outlets 136 may be arranged along the core flowpath 28 next to the respective turbine vane 114. The platform circuit outlets 136 of FIG. 5, for example, are arranged along a suction side 138 (e.g., convex side) of a respective one of the turbine vanes 114. In particular, the platform circuit outlets 136 of FIG. 5 are formed in and arranged along a base fillet 140 between the turbine nozzle inner platform 80 and the suction side 138 of the respective turbine vane 114. The platform circuit outlets 136 thereby respectively fluidly couple the platform circuit outlet passages 124 to the core flowpath 28.

Referring to FIG. 4, each platform cooling circuit 118 extends internally within the engine structure 38 from its platform circuit inlet 126 to its platform circuit outlets 136. A majority (or all) of each platform cooling circuit 118, including an entirety of each platform circuit outlet passage 124 of FIG. 4, is disposed within and extends internally within the turbine nozzle inner platform 80. With this arrangement, each platform cooling circuit 118 may bleed compressed core air from the diffuser plenum 60 to provide platform cooling air. Each platform cooling circuit 118 may direct this platform cooling air internally within the turbine nozzle inner platform 80 to air cool a surrounding region of the turbine nozzle inner platform 80. This cooling of the turbine nozzle inner platform 80 may also facilitate cooling of the respective neighboring turbine vane 114 by transferring heat energy out of the respective turbine vane 114 through the turbine nozzle inner platform 80 and into the platform cooling air. This platform cooling air may then be directed into the core flowpath 28 along the suction side 138 of the respective turbine vane 114 to provide at least some film cooling along the respective turbine vane suction side 138.

Figure 6:
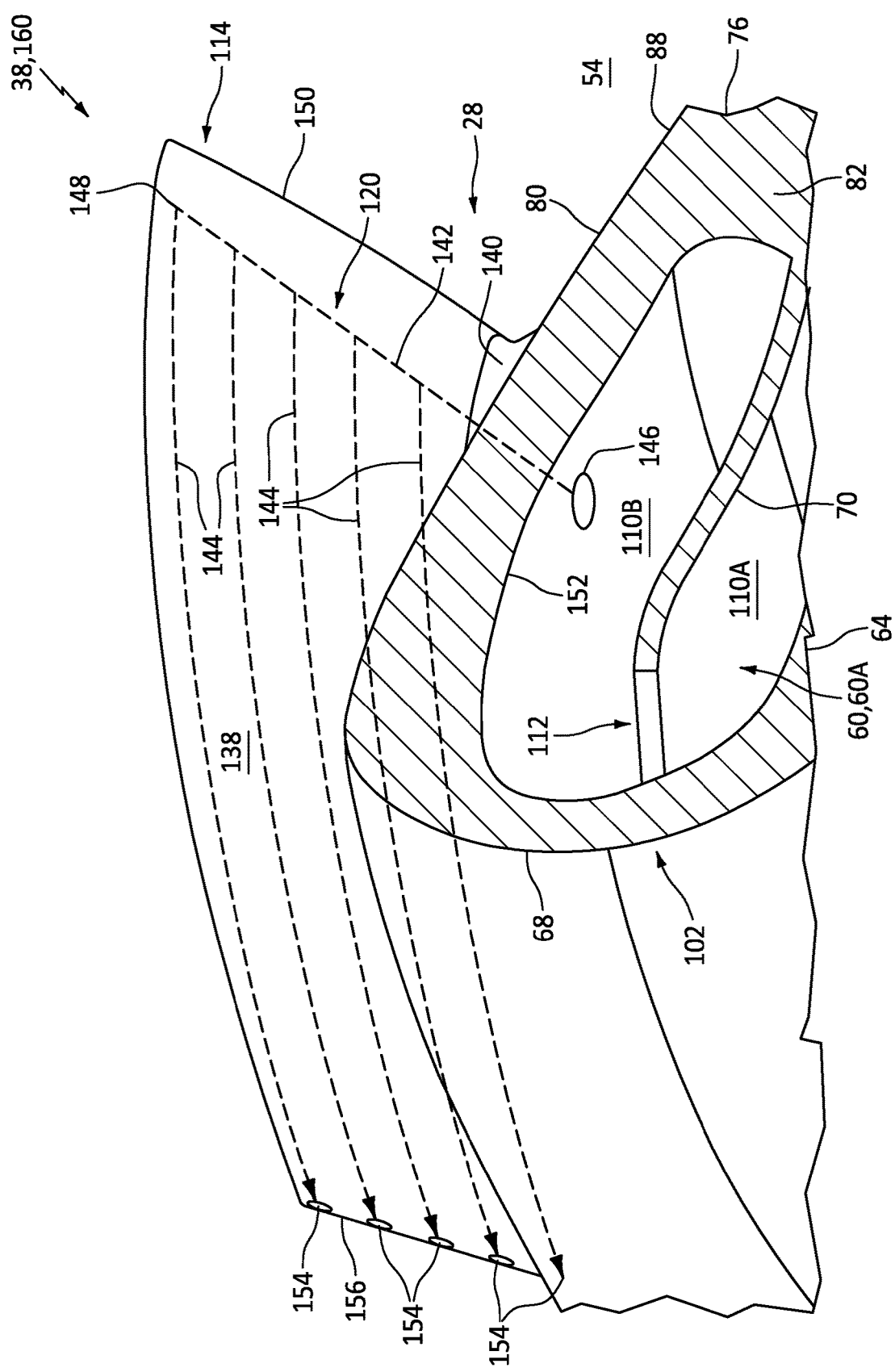
FIG. 6 is a perspective cutaway illustration of another portion of the turbine engine of FIG. 1 with the turbine nozzle and a vane cooling circuit.
Figure 8:
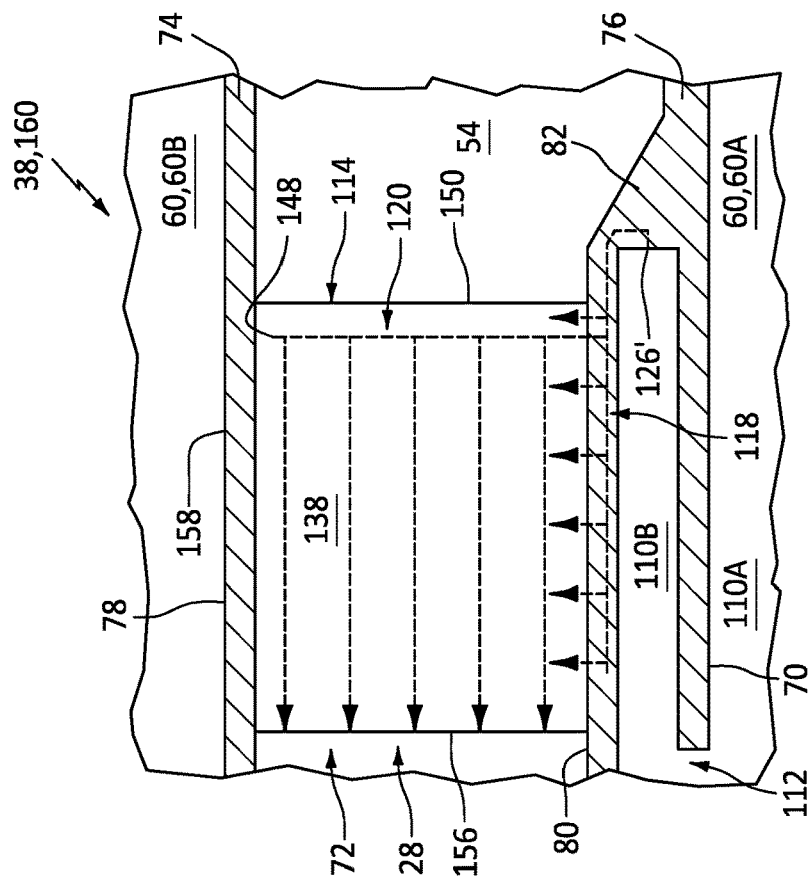
FIGS. 7-9 are schematic sectional illustrations of other portions of the turbine engine of FIG. 1 with alternative cooling system arrangements.

Referring to FIG. 6, each vane cooling circuit 120 is disposed substantially (or completely) within the respective turbine vane 114. Each vane cooling circuit 120 includes a vane circuit feed passage 142 and one or more vane circuit outlet passages 144. The vane circuit feed passage 142 fluidly couples (e.g., in parallel) a vane circuit inlet 146 into the respective vane cooling circuit 120 to the vane circuit outlet passages 144. The vane circuit feed passage 142 of FIG. 6, for example, extends, in the radial outward direction/spanwise, from the vane circuit inlet 146 to a distal end 148 of the vane circuit feed passage 142. This feed passage distal end 148 may be disposed next to (or setback radially inward from) the turbine nozzle outer platform 78; e.g., see FIG. 8. The vane circuit feed passage 142 of FIG. 6 is disposed in the respective turbine vane 114 proximate a leading edge 150 of the respective turbine vane 114; see also FIG. 3. The vane circuit inlet 146 is disposed along the plenum outer portion 110B. The vane circuit inlet 146 of FIG. 6, for example, is disposed along and formed in a radial inner surface 152 of the turbine nozzle inner platform 80, for example next to or near the intersection 82. The vane circuit inlet 146 thereby fluidly couples the diffuser plenum 60 to the vane circuit feed passage 142.

The vane circuit outlet passages 144 fluidly couple the vane circuit feed passage 142 to respective vane circuit outlets 154 from the vane cooling circuit 120. The vane circuit outlet passages 144 of FIG. 6, for example, are arranged longitudinally along the vane circuit feed passage 142. Each vane circuit outlet passage 144 extends longitudinally (e.g., along a mean line of the respective turbine vane 114) out from the vane circuit feed passage 142 to a respective one of the vane circuit outlets 154. These vane circuit outlets 154 may be arranged along the core flowpath 28 at a trailing edge 156 of the respective turbine vane 114. The vane circuit outlets 154 of FIG. 6, for example, are arranged spanwise along and formed in the trailing edge 156 of the respective turbine vane 114. The vane circuit outlets 154 thereby respectively fluidly couple the vane circuit outlet passages 144 to the core flowpath 28.

Each vane cooling circuit 120 extends internally within the engine structure 38 from its vane circuit inlet 146 to its vane circuit outlets 154. A majority of each vane cooling circuit 120, including a majority of its vane circuit feed passage 142 and all of each vane circuit outlet passage 144 of FIG. 6, is disposed within and extends internally within the respective turbine vane 114. With this arrangement, each vane cooling circuit 120 may bleed compressed core air from the diffuser plenum 60 to provide vane cooling air. Each vane cooling circuit 120 may direct this vane cooling air internally through the turbine nozzle inner platform 80 and into the respective turbine vane 114 to air cool the respective turbine vane 114. This vane cooling air may then be exhausted into the core flowpath 28.

In some embodiments, referring to FIG. 6, the vane circuit inlet 146 may be disposed with the turbine nozzle inner platform 80. With such an arrangement, each vane cooling circuit 120 is fluidly coupled with the radial inner section 60A of the diffuser plenum 60. In other embodiments, referring to FIG. 7, the vane circuit inlet 146 may alternatively be disposed with the turbine nozzle outer platform 78. The vane circuit inlet 146 of FIG. 7, for example, is disposed along and formed in a radial outer surface 158 of the turbine nozzle outer platform 78. With such an arrangement, each vane cooling circuit 120 is fluidly coupled with the radial outer section 60B of the diffuser plenum 60.

Figure 7:
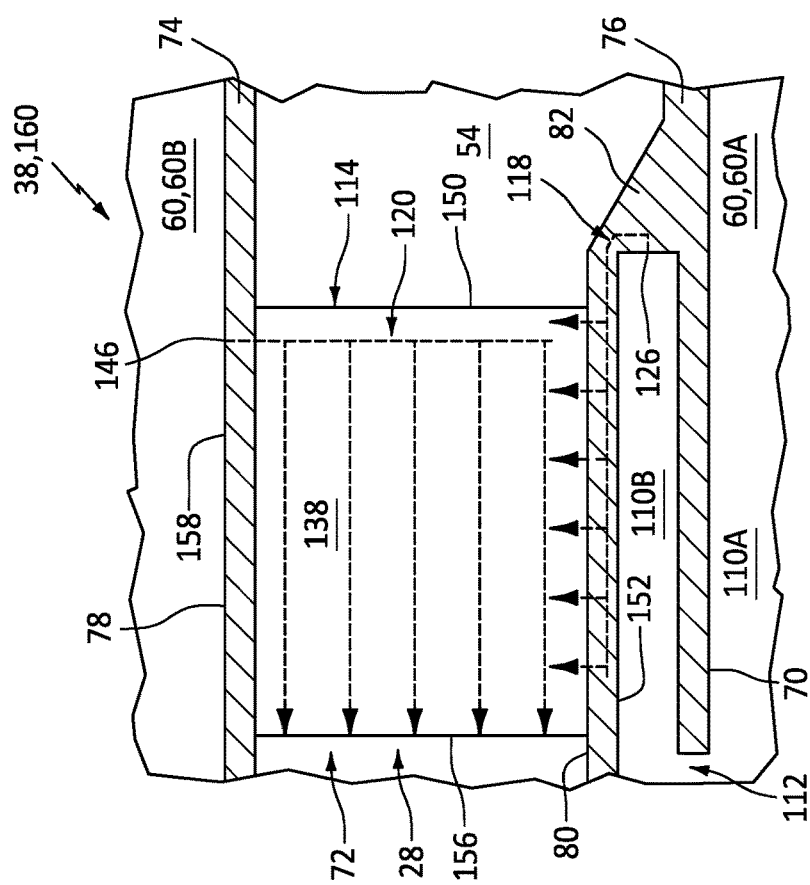

In some embodiments, referring to FIG. 7, each platform cooling circuit 118 may be fluidly discrete from each vane cooling circuit 120 internally with the engine structure 38. In other embodiments, referring to FIG. 8, the platform cooling circuit 118 and the vane cooling circuit 120 associated with a common (the same) turbine vane 114 may share a common inlet 126' bleeding the compressed core air from the diffuser plenum 60.

Figure 9:
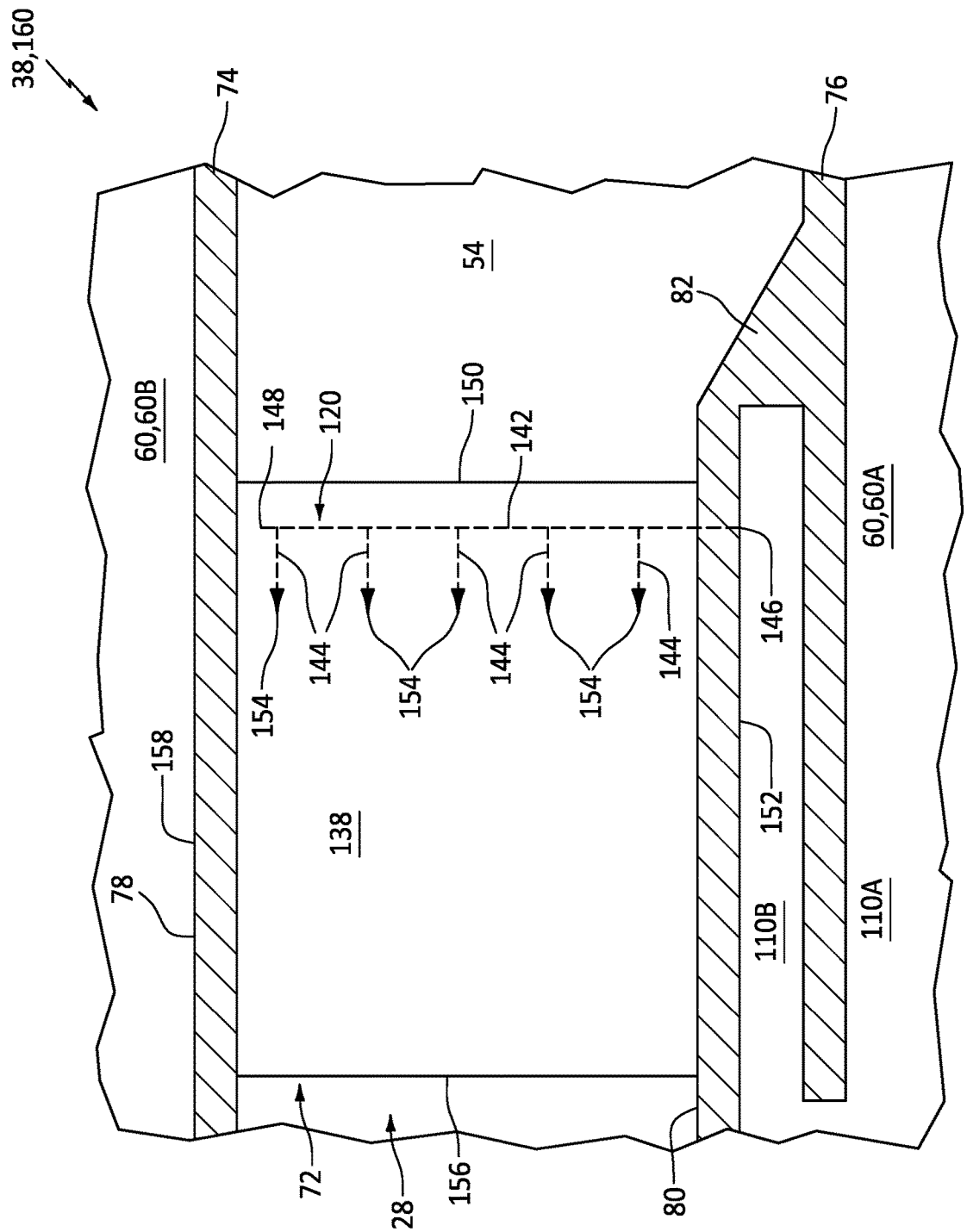

In some embodiments, referring to FIG. 9, one or more or all of the vane circuit outlets 154 from a respective vane cooling circuit 120 may be arranged along the respective turbine vane 114 upstream of its trailing edge 156. The vane circuit outlets 154 of FIG. 9, for example, are arranged along and formed in the suction side 138 of the respective turbine engine 20, for example closer to the leading edge 150 than the trailing edge 156. With this arrangement, the vane cooling air exhausted from the respective vane cooling circuit 120 into the core flowpath 28 may also be effused to effusion cool an exterior of the respective turbine vane 114. Note, while the vane cooling circuit 120 is shown in FIG. 9 without a corresponding platform cooling circuit 118 for ease of illustration, it is contemplated this vane cooling circuit 120 may also (or may not) be paired with any one of the platform cooling circuit configurations described herein.

Figure 10:
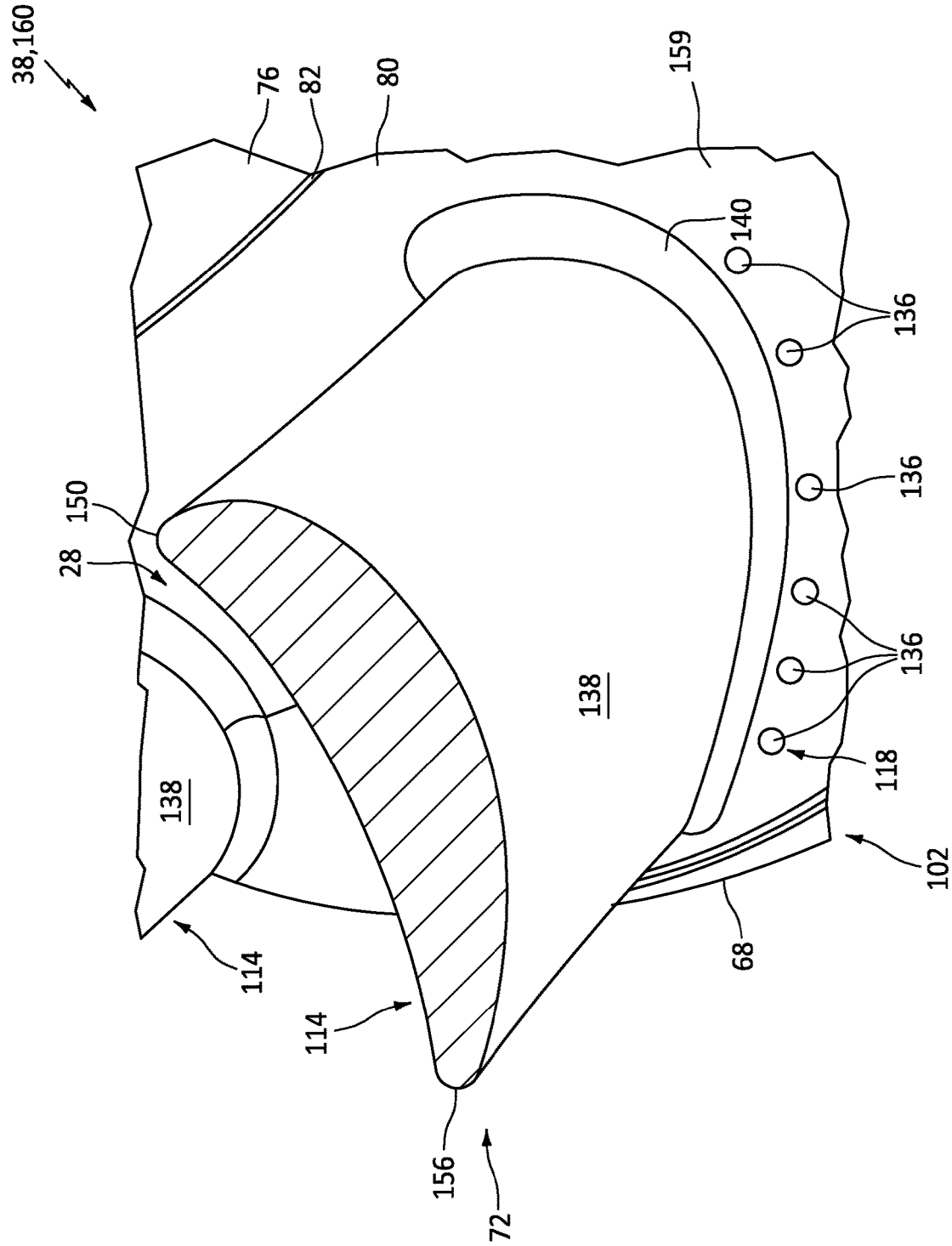
FIG. 10 is a perspective cutaway illustration of another portion of the turbine engine of FIG. 1 with the turbine nozzle and the platform cooling circuit with alternative arrangement of circuit outlets.
Figure 11:
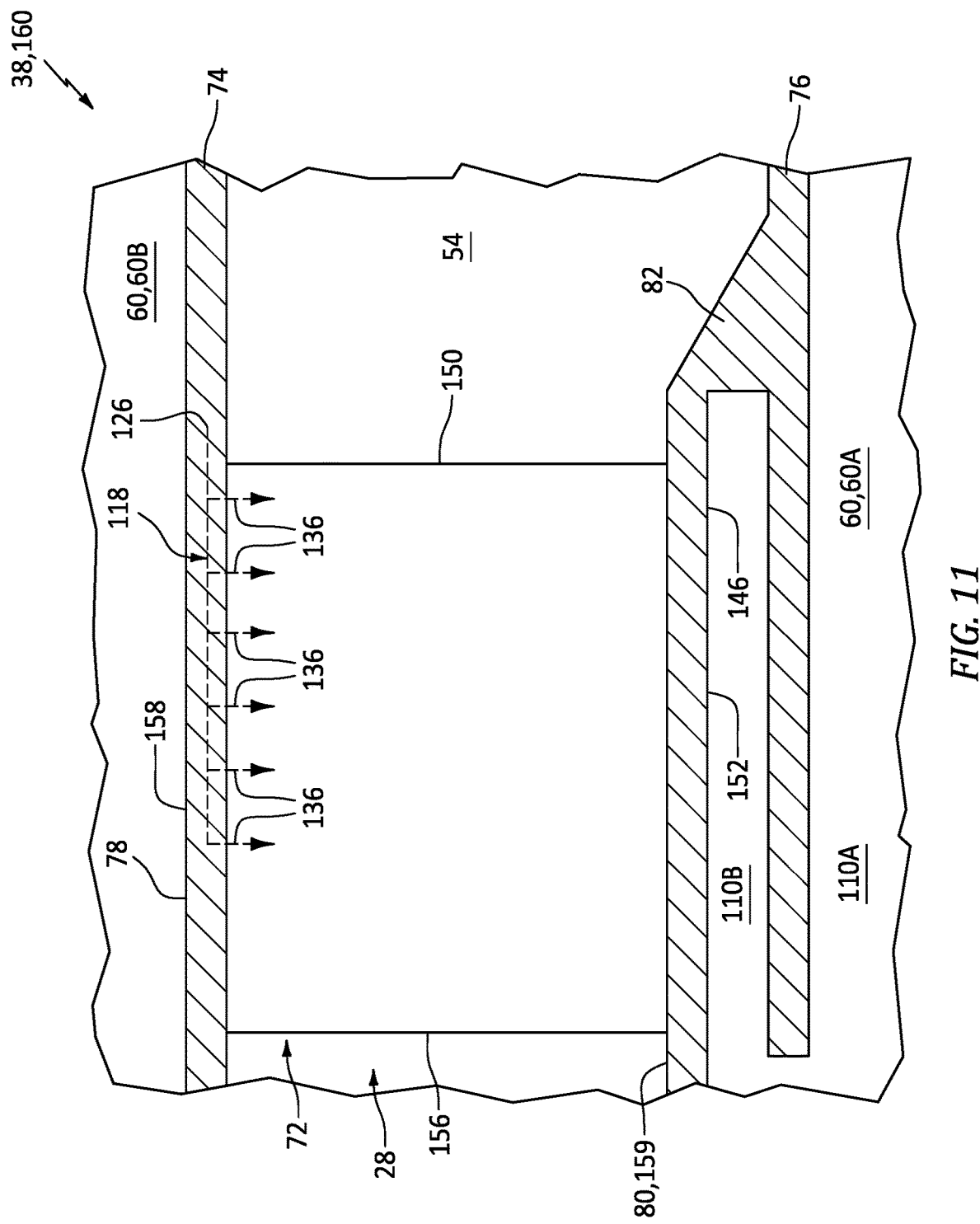
FIG. 11 is a schematic sectional illustration of another portion of the turbine engine of FIG. 1 with an alternative cooling system arrangement.

In some embodiments, referring to FIG. 5, the platform circuit outlets 136 may be formed in the base fillet 140 between the turbine nozzle inner platform 80 and the suction side 138 of the respective turbine vane 114. In other embodiments, referring to FIG. 10, one or more of the platform circuit outlets 136 may alternatively be adjacent or spaced out from the base fillet 140. The platform circuit outlets 136 of FIG. 10, for example, are formed in a radial outer surface 159 of the turbine nozzle inner platform 80. Moreover, while the platform circuit outlets 136 are shown at the turbine nozzle inner platform 80, it is contemplated the platform circuit outlets 136 and, more generally, each platform cooling circuit 118 may alternatively be arranged at the turbine nozzle outer platform 78 as shown, for example, in FIG. 11. Note, while the platform cooling circuit 118 is shown in FIG. 11 without a corresponding vane cooling circuit 120 for ease of illustration, it is contemplated this platform cooling circuit 118 may also (or may not) be paired with any one of the vane cooling circuit configurations described herein.

Figure 13:
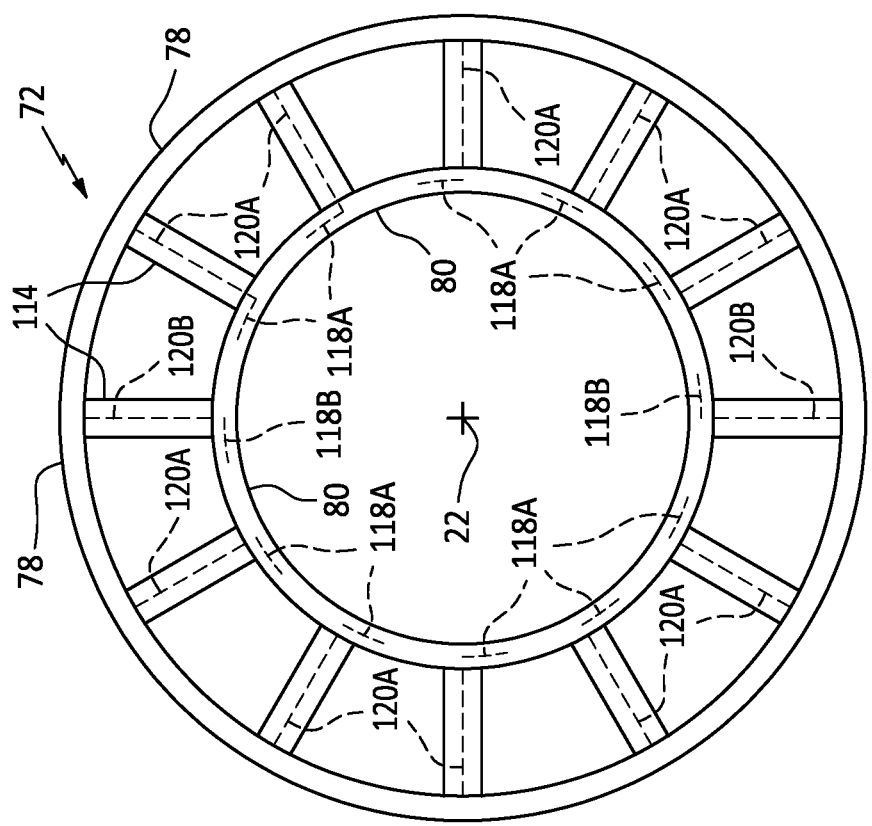
FIGS. 12 and 13 are schematic end view illustrations of the turbine nozzle with various non-uniform cooling system arrangements.
Figure 12:
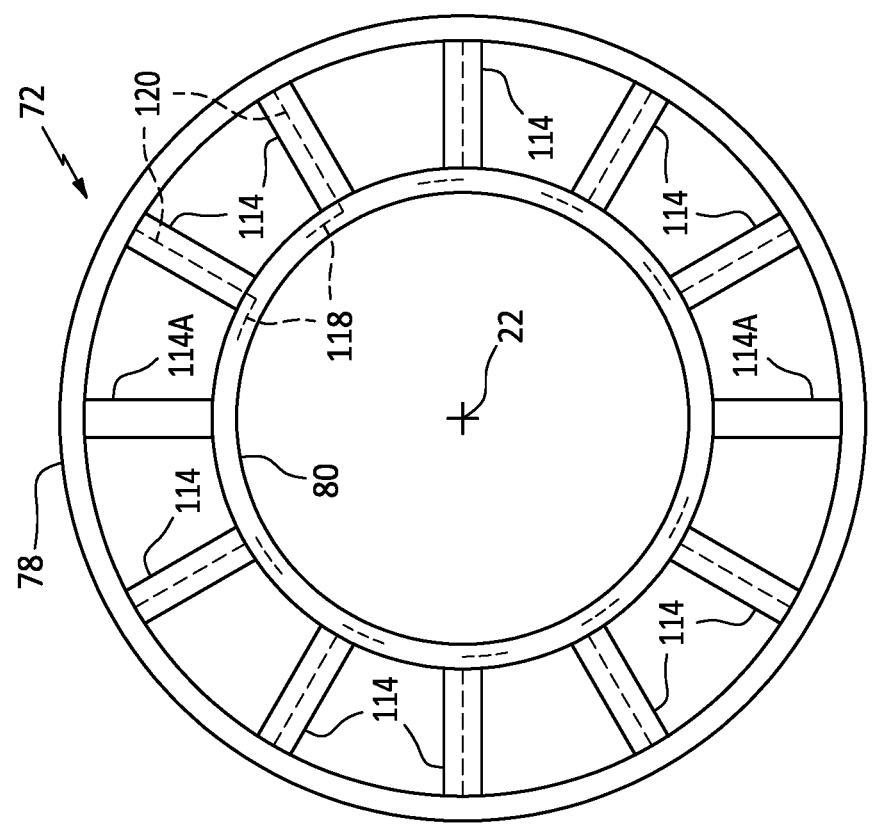

While each turbine vane 114 is described above as being associated with both a respective one of the platform cooling circuits 118 and a respective one of the vane cooling circuits 120, the present disclosure is not limited to such an exemplary arrangement. The cooling system 116, for example, may omit some or all of the platform cooling circuits 118. In another example, the cooling system 116 may omit some or all of the vane cooling circuits 120. Moreover, while the cooling system 116 is described above as equally cooling each turbine vane 114 and/or circumferential sections of the turbine nozzle inner platform 80, it is contemplated the turbine vanes 114 and/or circumferential sections of the turbine nozzle inner platform 80 may alternatively be asymmetrically cooled. For example, referring to FIG. 12, one or more of the turbine vanes 114 may be uncooled vanes; e.g., vanes 114A. In another example, referring to FIG. 11, one or more of the turbine vanes 114 may receive more cooling air than others of the turbine vanes 114. The configurations of the cooling circuits (e.g., 118A and/or 120A) may be tailored (e.g., sized) to flow more cooling air through some of the turbine vanes 114 than others of the cooling circuits (e.g., 118B and/or 120B). With the arrangements of FIGS. 12 and 13, the cooling system 116 may focus cooling on circumferential hot spots along the turbine nozzle 72.

Referring to FIG. 2, at least a portion (or an entirety) of the engine structure 38 may be formed as a monolithic body 160; see also FIG. 1. At least the stationary structure members 52, 62, 64, 66, 68, 70 and 72 of FIG. 2, for example, are included in the monolithic body 160. Herein, the term "monolithic" may describe an apparatus which is formed as a single, unitary body. The stationary structure members 52, 62, 64, 66, 68, 70 and 72, for example, may be additively manufactured, cast, machined and/or otherwise formed together as an integral, unitary body. By contrast, a non-monolithic body may include multiple parts which are discretely formed from one another, where those parts are subsequently mechanically fastened and/or otherwise attached to one another.

The turbine engine 20 is described above as a single spool, radial-flow turbojet gas turbine engine for ease of description. The present disclosure, however, is not limited to such an exemplary turbine engine. The turbine engine 20, for example, may alternatively be configured as an axial flow gas turbine engine. The turbine engine 20 may be configured as a direct drive gas turbine engine. The turbine engine 20 may alternatively include a geartrain that connects one or more rotors together such that the rotors rotate at different speeds. The turbine engine 20 may be configured with a single spool (e.g., see FIG. 1), two spools, or with more than two spools. The turbine engine 20 may be configured as a turbofan engine, a turbojet engine, a propfan engine, a pusher fan engine or any other type of turbine engine. In addition, while the turbine engine 20 is described above with an exemplary reverse flow annular combustor, the turbine engine 20 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
an engine structure including a plenum, a reverse flow combustor, a nozzle structure, a cooling circuit, a turbine wall and an intermediate structure;
the reverse flow combustor disposed in the plenum and comprising a combustion chamber;
the nozzle structure arranged at an outlet from the combustion chamber, the nozzle structure including a first platform, a second platform and a plurality of vanes arranged circumferentially about an axis, the first platform forming a first boundary of a flowpath through the nozzle structure, the second platform forming a second boundary of the flowpath, and the plurality of vanes extending across the flowpath from the first platform to the second platform;
the cooling circuit extending in the first platform and between a circuit inlet into the cooling circuit and a circuit outlet from the cooling circuit, the circuit inlet fluidly coupled with and disposed along the plenum, and the circuit outlet fluidly coupled with and disposed along the flowpath;
the turbine wall axially overlapping the reverse flow combustor and the nozzle structure;
the intermediate structure extending along the flowpath between a downstream end of the first platform and an upstream end of the turbine wall; and
the circuit inlet disposed along a portion of the plenum bordered by the first platform and the intermediate structure.

2. The assembly of claim 1, wherein
the plurality of vanes comprise a first vane; and
the circuit outlet is formed in a fillet between the first platform and the first vane.

3. The assembly of claim 1, wherein
the plurality of vanes comprises a first vane; and
the circuit outlet is formed in a surface of the first platform along the first vane.

4. The assembly of claim 1, wherein
the plurality of vanes comprises a first vane; and
the circuit outlet is disposed along and next to a suction side of the first vane.

5. The assembly of claim 1, wherein
the plurality of vanes comprises a first vane;
the circuit outlet is a first circuit outlet, and the cooling circuit further extends between the circuit inlet and a second circuit outlet from the cooling circuit; and
the first circuit outlet and the second circuit outlet are arranged longitudinally along a side of the first vane.

6. The assembly of claim 5, wherein the side of the first vane comprises a convex side of the first vane.

7. The assembly of claim 1, wherein
the plurality of vanes comprises a first vane; and
the cooling circuit further extends in the first vane.

8. The assembly of claim 7, wherein
the first vane extends longitudinally within the flowpath between a leading edge of the first vane and a trailing edge of the first vane; and
the circuit outlet is arranged at the trailing edge of the first vane.

9. The assembly of claim 8, wherein
the circuit outlet is a first circuit outlet, and the cooling circuit further extends between the circuit inlet and a second circuit outlet from the cooling circuit; and
the first circuit outlet and the second circuit outlet are arranged along the trailing edge of the first vane.

10. The assembly of claim 7, wherein the circuit outlet is formed in a side surface of the first vane.

11. The assembly of claim 10, wherein the side surface of the first vane is a suction side surface of the first vane.

12. The assembly of claim 10, wherein
the circuit outlet is a first circuit outlet, and the cooling circuit further extends between the circuit inlet and a second circuit outlet from the cooling circuit; and
the first circuit outlet and the second circuit outlet are arranged along the side surface of the first vane.

13. The assembly of claim 1, wherein
the first platform is an inner platform; and
the second platform is an outer platform that circumscribes the inner platform.

14. The assembly of claim 1, wherein
the second platform is an inner platform; and
the first platform is an outer platform that circumscribes the inner platform.

15. The assembly of claim 1, wherein
the reverse flow combustor further comprises a combustor wall connected to the first platform at an intersection;
the engine structure further includes a divider wall radially between the first platform and the turbine wall, and the divider wall projects axially from the intersection towards the intermediate structure; and
the portion of the plenum extends radially between the first platform and the divider wall, and the portion of the plenum extends axially between the intermediate structure and the intersection.

16. The assembly of claim 1, wherein
the plurality of vanes include a first vane and a second vane;
the cooling circuit is a first cooling circuit configured to air cool the first vane; and
the engine structure further includes a second cooling circuit configured to air cool the second vane, the second cooling circuit extends in the first platform and between a second circuit inlet into the second cooling circuit and a second circuit outlet from the second cooling circuit, the second circuit inlet is fluidly coupled with and disposed along the plenum, and the second circuit outlet is fluidly coupled with and disposed along the flowpath.

17. The assembly of claim 1, wherein the engine structure is a monolithic body.

18. An assembly for a turbine engine, comprising:
an engine structure including a plenum, a combustor, a nozzle structure, a turbine wall, an intermediate structure and a cooling circuit;
the combustor disposed in the plenum and comprising a combustion chamber;

the nozzle structure including a first platform, a second platform and a plurality of vanes arranged circumferentially about an axis, each of the plurality of vanes extending across a flowpath through the nozzle structure from the first platform to the second platform;
the turbine wall axially overlapping the combustor and the nozzle structure;
the intermediate structure extending along the flowpath between a downstream end of the first platform and an upstream end of the turbine wall; and
the cooling circuit disposed in the first platform and extending between a circuit inlet into the cooling circuit and a circuit outlet from the cooling circuit, the circuit inlet fluidly coupled with and disposed along a portion of the plenum bordered by the first platform and the intermediate structure, and the circuit outlet fluidly coupled with and disposed along the flowpath.

* * * * *